June 14, 1932.  G. H. ROBERTS  1,862,983

PISTON RING

Filed Oct. 31, 1931  2 Sheets-Sheet 1

INVENTOR
George H. Roberts
BY  Evans + McCoy
ATTORNEYS

UNITED STATES PATENT OFFICE

GEORGE H. ROBERTS, OF ROCK ISLAND, ILLINOIS, ASSIGNOR TO AMERICAN TRUST CO., TRUSTEE, OF DAVENPORT, IOWA, A CORPORATION OF IOWA

PISTON RING

Application filed October 31, 1931. Serial No. 572,281.

This invention relates to piston and piston ring assemblies for fluid engines, such as internal combustion engines, steam engines, air compressors, fluid pumps and other devices requiring packing rings, and is a continuation in part of my copending application Serial No. 429,184, filed February 10, 1930.

The conventional piston and ring assemblies, the rings are initially fitted in the piston grooves relatively tightly to prevent the fluid within the cylinder from setting up excessive pressures back of the rings. In these constructions, the cooperating contact faces of the ring and groove wear after continued use, with the result that excessive pressures are created back of the rings by reason of the leakage of fluid therebetween, which increases the forces tending to expand the ring, and thereby causes excessive cylinder and ring wear. In these constructions no means is provided for controlling the expansion of the rings in accordance with the pressure conditions within the engine cylinder.

Furthermore, particularly in the case of conventional internal combustion engines, the wearing of the side walls of conventional ring grooves results in loss of the seal between the ring and the ring groove side walls, thereby causing excessive leakage between the ring and ring groove walls during compression, firing and exhaust strokes, and an increased sucking action between the ring and ring groove walls during intake strokes that causes oil to be drawn into the combustion chamber. This increased action during the intake stroke also results in an inadequate intake charge, thereby reducing efficiency of operation.

It is one of the objects of the present invention to overcome these disadvantages and provide a piston and ring assembly in which the expansion of the ring, and therefore the degree of frictional contact, is controlled at all times in order not to create unnecessary cylinder wall pressures when such pressures are not necessary to seal the pressure of the fluid existing within the cylinder, thereby increasing the life and performance of the ring as compared with conventional piston rings.

Another object is to provide a piston and piston ring assembly of new and improved construction in which the pressure of the ring acting against the cylinder wall is largely controlled by the action of the fluid in the cylinder causing engagement between the ring and cylinder wall to form a seal adequate for the pressure existing in the cylinder.

Another object is to provide a piston and ring assembly in which the frictional forces heretofore encountered are somewhat balanced, and which, during operation in an engine cylinder, maintains an adequate seal with a minimum of wall friction.

Another object is to provide a one-piece split piston ring for an engine cylinder which maintains an adequate seal with the engine cylinder and piston with fluid pressures acting in one or both directions against the ring, and with a minimum of cylinder wall friction.

Another object is to provide a piston and ring of such construction for engine cylinders that the ring is free to move in the groove and automatically forms an adequate seal with the piston and the cylinder in accordance with the pressure of the fluid existing within the engine cylinder, thereby preventing objectionable leakage between the ring and its cooperating groove walls and between the ring and cylinder wall.

A further object is to provide a piston ring in which the pressures acting within the engine cylinder largely control the expansion and contraction of the ring.

A still further object is to provide a piston and ring of such construction that the pressures of the fluid within the engine cylinder act radially and axially against the ring which, together with the contacting surfaces of the ring and piston, controls the expansion pressure of the ring in order to maintain an adequate seal with a minimum of cylinder wall friction.

With the above and other objects in view which will be apparent from the following detailed description, the present invention may be said to consist in certain novel features of construction and combinations of parts which will be readily understood by those skilled in the art to which the invention appertains.

In the drawings which illustrate suitable embodiments of the present invention,

Figure 2:
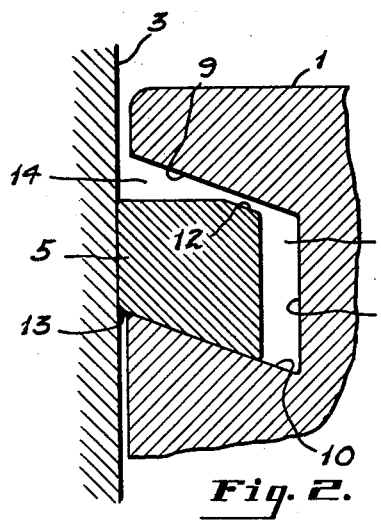
Fig. 2 is an enlarged fragmentary section of the piston and ring shown in Fig. 1, illustrating the cooperation and relative positions of the same when the piston is acting during the compression, firing and exhaust strokes.
Figure 3:
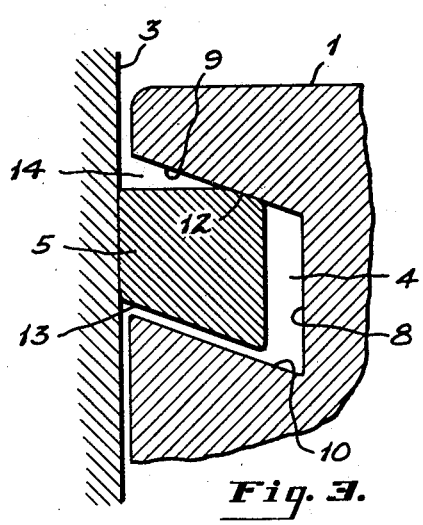
Fig. 3 is a view similar to Fig. 1 illustrating the relative positions of the piston and ring when the piston is acting during the intake stroke.
Figure 4:
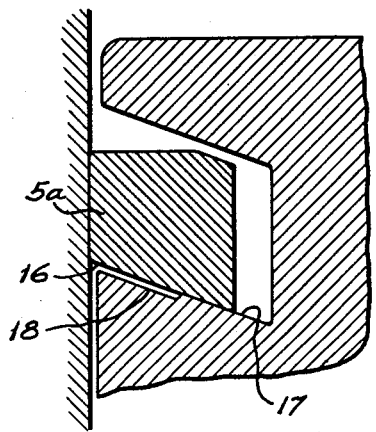
Figure 5:
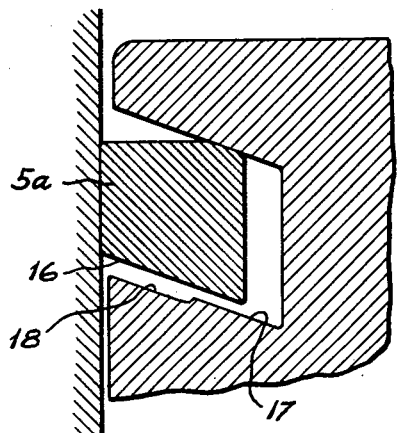
Figure 6:
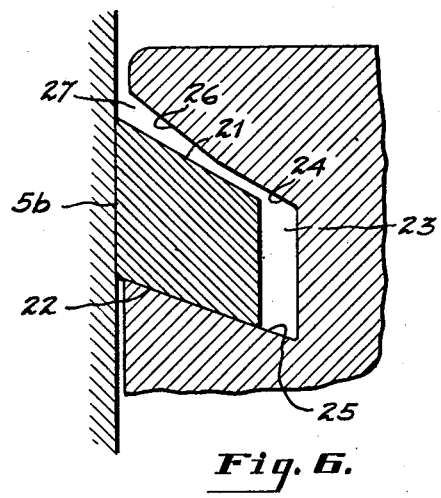
Figure 7:
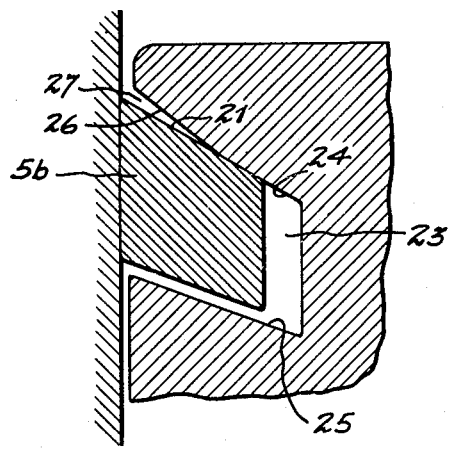

Figs. 4 and 5 are fragmentary sections corresponding with Figs. 2 and 3 but showing a slight modification thereover; and Figs. 6 and 7 likewise are sections corresponding to Figs. 2 and 3 but illustrating further different modifications of the same.

Referring to the drawings in which like numerals refer to like parts throughout the several views, the piston ring of the present invention is shown in connection with an internal combustion engine piston having a conventional head 1 and skirt 2. It is to be understood, however, that the ring of the present invention is also applicable to any type of piston requiring the use of packing rings. The piston is shown as mounted in an engine cylinder 3 in order to illustrate the contact between the piston rings and cylinder wall. The piston head 1 is provided with an uppermost ring groove 4 which receives the ring 5 of the present invention to be later described, and one or more ring grooves 6 which receive conventional rings 7.

Figure 1:
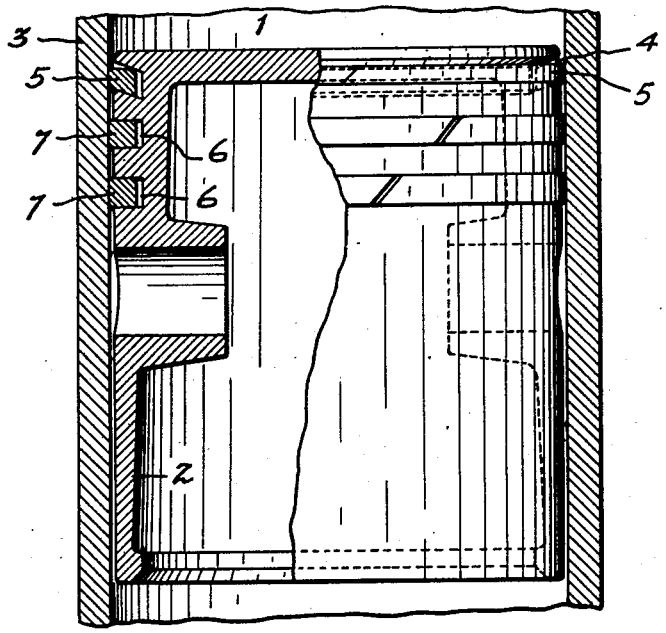
Figure 1 is a fragmentary elevation of a piston and ring construction suitable for internal combustion engines, a portion of the piston being broken away to show the cooperating bearing surfaces of the piston and ring, the piston being shown as mounted in an engine cylinder.

In the construction illustrated in Figs. 1, 2 and 3 the uppermost ring groove 4 is formed with an axial bottom wall 8 and upper and lower side walls 9 and 10, respectively. The side walls 9 and 10 are shown in these views as parallel and extend at an angle toward the head of substantially 20 degrees from the horizontal. Furthermore, the side walls 9 and 10 may not necessarily be parallel, but may diverge away from the bottom wall 8. It will be seen that the pressure of the ring against the wall of the cylinder can be controlled by providing a suitable angle for the lower side wall 10 of the groove, and while I have shown an angle of 20 degrees for the ring side wall 10, it is to be understood that this angle may be more or less than 20 degrees, depending upon the characteristics of the engine in which the ring is to operate. By decreasing the angle of inclination of the side wall 10, the ring will be forced by the gas pressures, on the compression, firing and exhaust strokes, against the wall of the cylinder with greater pressure than when the angle is steeper, as there will be less resistance offered by the side wall 10 to the expansion of the ring against the cylinder, and, conversely, by increasing the angle of inclination of the side wall 10, the ring will be forced by the gas pressure against the wall of the cylinder with a lesser pressure.

The inclination of the groove side wall 9, however, should be at such an angle that during the intake stroke the component of cylinder wall friction and the differential gas pressure acts to force the ring in an axial direction against the inclined wall 9 of the piston groove with sufficient pressure to cause the ring to expand and maintain an adequate seal with both the cylinder wall and groove side wall 9 of the piston to prevent leakage of gas or oil.

The ring 5 is of the single piece split type, as shown in Fig. 1, and is formed with sides 12 and 13 that are formed to substantially the same angle as the corresponding side walls 9 and 10 of the ring groove 4 in order to provide correspondingly shaped circumferential bearing surfaces.

The side 12 of the ring adjacent the head end of the piston is not inclined throughout its width but is formed with a relatively narrow inclined face adjacent its inner periphery and with the remainder of the face substantially perpendicular to the axis of the ring, thus providing as shown in Fig. 2, an upper circumferential bearing face of materially less area than the face of the opposite side 13 which has engagement with the full side wall 10 of the groove, and a space or pocket 14 radially outwardly of the inclined face portion between the side wall 12 of the ring and the side wall 9 of the piston groove 4. The narrow bearing face at the side 12 of the ring may be adjacent the inner periphery as shown or may be disposed radially outwardly thereof on the face 12.

The ring 5 is fitted within the groove 4 with material axial and radial clearances for a purpose to be later described. The ring furthermore is provided with a low initial stress as compared with conventional piston rings. In conventional motor vehicle engine constructions the seal between the ring and cylinder is dependent on the initial stress of the ring and in order to maintain an adequate seal at all times during the complete cycle of operation, the ring is provided with high initial stress of approximately twelve pounds for a cylinder of 3" bore. This creates a high bearing engagement between the cylinder wall and ring throughout the complete cycle of operation.

In the construction of the present invention, an adequate seal is maintained during the entire cycle of operation of the engine with a minimum of wall friction and wear. The ring inherently requires no substantial initial stress, although it may be formed with a low stress of approximately three or four pounds for an internal combustion engine cylinder of 3 inch bore to maintain a slight pressure against the cylinder wall when the ring changes position between upper and lower positions in the groove. The ring depends primarily on the fluid pressure differential for the maintenance of an adequate seal with the cylinder wall and the piston. Hence the ring 5 automatically adjusts the force with which it bears on the cylinder wall in accordance with the existing pressure within the cylinder, and consequently does not exert a high wall pressure to seal a low fluid pressure, as in the conventional piston assemblies.

This contrast may be summarized by stating that the initial stress in conventional piston rings must be sufficient to maintain an adequate seal under maximum explosion pressures and hence a more than adequate seal under all other conditions, whereas with the ring of the present invention the adequate seal maintained throughout the cycle of operation is automatically adjusted in accordance with the pressure required to be sealed, and furthermore this seal is maintained with pressures acting in either direction.

The axial and radial actions of the gas pressure are utilized in the piston and piston ring constructions shown in the drawings to maintain a proper but not excessive seal. That is, the ring and piston are constructed in such a manner that the fluid within the engine cylinder acts axially against the ring and also acts radially against the inner periphery of the ring with the result that the objectionably high pressures against the cylinder wall are not attained.

In conventional piston and ring assemblies, and particularly in those used in connection with tapered engine cylinders, the movement of the piston about its transverse axis is so great that the rings are frequently tilted away from the face of the cylinder wall, thereby rounding off the corners of the ring and also destroying the parallel face of the ring which may result in the loss of an adequate seal at the cylinder wall.

The axial clearance and the inclined circumferential bearing surfaces between the ring and piston of the present invention permit the piston to move about its transverse axis without drawing or tilting the ring away from the cylinder wall, with the result that the ring remains substantially parallel with the cylinder at all times and maintains a constant and adequate seal with the cylinder wall as well as with the piston groove.

During the intake stroke, the narrow inclined circumferential bearing surface makes possible a positive seal between the ring and groove side wall nearest the closed end of the piston while maintaining an adequate seal between the cylinder wall and ring, thereby materially lessening the tendency of oil to be sucked past the piston and thereby providing a more satisfactory intake charge which is vital to efficient operation.

The piston ring 5 when used in connection with internal combustion engines seats against the lower wall 10 of the ring groove 4 during the major portion of the compression, firing and exhaust strokes, as shown in Fig. 2, and seats against the upper ring groove wall 9 during the intake stroke as shown in Fig. 3. It will be noted that the circumferential bearing face on the upper side 12 of the ring is relatively small as compared with the circumferential bearing face of the lower side of the ring and is relatively narrow. The small seating area is very advantageous in that the unit bearing pressure between the upper face 12 of the ring and wall 9 of the piston groove 4 is of much greater magnitude than if a full contact were made, thus creating a more effective seal throughout the intake stroke. At certain high engine speeds the axial inertia of the ring may be greater than the force of gas pressure, and the resultant force tending to seat the ring is low, and it is, therefore, obvious that by providing a small bearing area the unit bearing pressure is of greater magnitude, which results in a better seal.

It will be noted that two seals are maintained at substantially all times, an outer seal between the ring and cylinder wall and an inner seal between the ring and one or the other of the groove walls, depending on the particular stroke in the cycle of operation.

During the intake stroke the pressure differential is slight and acting toward the piston head, and the component of friction drag due to the inclined upper wall of the groove is sufficient to force the ring radially outward to maintain an adequate seal with the cylinder wall. As to the upper seal between the inclined surfaces 9 and 12, the slight pressure differential and the other component of friction drag is positive and acts directly against the upper groove wall 9 and therefore maintains an adequate seal.

During the compression stroke the outer seal at the cylinder wall is adequately maintained in accordance with the gas pressure. Because of the inclined lower bearing surfaces of the ring and groove, the gas pressure acting radially against the inner periphery of the ring overcomes the negative radial component of cylinder wall friction and the negative radial component of axial gas pressure. Therefore, it is obvious that the outer sealing pressure will automatically increase with an increase in the pressure of the gases being compressed. This is also true of the inner seal between the ring 5 and lower groove wall 10 since the direct axial pressure and components of radial pressure and wall friction are positive and will increase in accordance with the increase in gas pressure.

During the transition from the compression stroke to the explosion stroke, the ring may engage the upper groove wall 9, but due to the fact that the upper surface of the ring is nearly radial and has a large area exposed to the full explosive pressure, restoration of the ring to the lower seat will occur early in the cycle and be very rapid because, when the pressure is sufficient to cause the ring to leave the top seat it will have a tendency to rapidly snap into engagement with the lower seat. In other words, the pocket 14 formed between the upper surface of the ring and the groove will have a tendency to build up high pressures until the ring starts to leave the upper seat, after which, this high pressure will act suddenly to restore the ring to its lower seat.

Considering the outer seal during the firing stroke, the radial pressure is always direct, high and positive, and is of greater magnitude than the negative radial component of axial pressure due to the angle of inclination of the lower seat. As to the inner seal, the axial pressure and component of radial pressure are positive and these combined forces are greater than and overcome the component of wall friction pressure with the result that an adequate seal is maintained between the ring and piston by a pressure which decreases in accordance with a decrease in combustion pressure.

The action of forces during the exhaust stroke is similar to that occurring during the compression stroke, although of different magnitude and need not be repeated.

Although the area of contact between the ring and wall of the groove nearest the open end of the piston shown in Fig. 2 is illustrated as being of greater magnitude than the area of contact between the ring and opposite groove wall, it is to be understood that this area may be materially reduced and may be of the same or even lesser magnitude than the other seal. This may be occasioned by the fact that a quicker acting, smoother seal is desired, and in order to accomplish the same the width of contact area may be materially decreased, with the result that a higher unit pressure is obtained. This will produce a quick-acting seal, as well as providing a circumferential bearing surface which will polish rapidly and produce a smooth contacting surface.

This may be accomplished by forming a relatively narrow seating surface, either on the ring itself or on the side wall of the groove nearest the open end of the piston. One method of accomplishing this is shown in Figs. 4 and 5, in which the lower side face 16 of the ring 5a remains the same as the corresponding face of the ring shown in Fig. 2, and in which the inclined side wall 17 of the groove is cut away at 18 in any desired manner at the outer portion of the groove to materially reduce the area of contact between the side face of the ring and the side wall of the groove.

Although the area of contact between the side face 16 of the ring and the side wall 17 of the groove is shown greater than the area of contact between the opposite co-acting surfaces of the ring and groove, it is to be understood that they may be of the same magnitude, or even less magnitude than the opposite area of contact, depending, of course, upon the conditions that are desired.

The action of the piston assembly shown in Figs. 4 and 5 will be substantially the same as the assembly shown in Figs. 2 and 3, but the magnitude of forces will be changed to accomplish different results.

A further modification of a piston assembly of the present invention is shown in Figs. 6 and 7, wherin the ring 5b is of trapezoidal shape, the side faces 21 and 22 thereof being formed at different angles to diverge toward the outer periphery of the ring. The groove 23 for the ring 5b is formed with side walls 24 and 25, respectively, which are formed to substantially the same angles as the respective side faces 21 and 22 of the ring 5b. In this construction the relatively small bearing area between the surfaces 21 of the ring and the side wall 24 of the groove is formed by chamfering off the outer portion of the groove side wall 24, as shown at 26, to provide the desired pocket 27 between the ring and groove. The action of the piston and ring assembly is similar to the action of the construction shown in Figs. 2 and 3, with the exception, however, that the magnitude of forces is somewhat changed, due to the full inclination of the side face 21 of the ring 5b. It is to be understood, however, that the side faces 21 and 22 may be parallel as in the constructions shown in Figs. 2 and 4.

In conventional piston and ring assemblies, the rings are fitted within the cylinder with a material clearance between their ends to prevent seizure with the cylinder wall and ring lands when they expand during their subjection to heat. The disadvantage in employing a wide clearance between the ring ends is readily apparent as it can be seen that a continuous circumferential seal with the cylinder cannot be maintained.

By reason of the axial clearance provided in the piston and ring assembly of the present invention, the ring described is fitted in the bore of the cylinder with its ends in abutting relation, which obviates the necessity of providing large clearances between the ends of the ring. Under normal operating conditions the ring ends will be in abutting or relatively close relation, resulting in the maintenance of a better seal and consequently better performance, since such a construction will prevent the passage of fluid, between the ends of the ring. Under severe heat conditions, the ends of the ring are permitted by reason of the axial clearance, to temporarily override each other without seizure with the walls of the cylinder and ring groove.

In each of the constructions shown and described, a relationship between the piston and ring is provided which permits the use of a single compression ring which will maintain an adequate seal with pressures acting in either direction throughout the entire cycle of operation without causing high cylinder wall friction and wear. The ring, as previously stated, has a relatively low initial stress and is installed in the engine cylinder to provide an adequate seal under low gas pressures with a minimum of wall friction.

It is thus seen that a minimum wall pressure is provided, which pressure will be increased upon an increase in the pressure within the engine cylinder. In other words, the pressure exerted by the ring of the present invention is automatically adjusted in accordance with the pressure required to be sealed, whereas in the conventional types of piston rings, the initial stress must be sufficient to maintain the pressure required for an adequate seal under maximum explosion pressures and hence a more than adequate pressure under all other conditions.

The piston ring described is readily adaptable to out-of-round or tapered cylinders, and maintains a very good seal throughout the cylinder surface and ring groove side walls.

Due to the fact that the ring has inclined circumferential bearing surfaces and a clearance in an axial direction with respect to the ring groove, and is free to move in the groove, the piston is more free to align itself in the cylinder without forcing the ring to leave its seat and thus break the seal between the ring and cylinder.

By reason of the fact that the ring and wall pressure varies in accordance with the pressure within the engine cylinder and that the ring is initially installed with sufficient initial stress to provide a seal for low pressures, it is readily apparent that by the use of the ring described, cylinder wall friction and consequently cylinder wall wear is greatly reduced.

It will also be seen that by the maintenance of an adequate seal between the piston ring and the ring groove, and between the piston ring and the cylinder wall, as herein disclosed, objectionable leakage of oil or gas between the ring and the cooperating groove side walls, and between the ring and the cylinder wall, is prevented.

While the invention herein has been more specifically described in connection with internal combustion engines of the type having open end pistons, it is to be understood that the packing ring described and hereinafter set forth in the appended claims is applicable to steam engines, air compressors, fluid pumps of the piston type, and other fluid devices requiring the use of piston or packing rings to seal fluid pressures, irrespective of the specific construction of the piston employed in such devices.

Although it is usually preferred to install the ring in the engine cylinder with a relatively low initial stress or pressure against the cylinder wall, it is to be understood that the stress may be varied, as desired, to meet the conditions present in a particular engine construction.

Furthermore, it is to be understood that the particular form of product shown and described, and the particular procedure set forth, are presented for purposes of explanation and illustration and that various modifications of said product and procedure can be made without departing from my invention as defined in the appended claims.

What I claim is:

1. A piston assembly comprising a piston having a peripheral groove adjacent the closed end thereof, said groove having side walls inclined from their marginal outer edges toward the open end of said piston, and a split single piece ring having one side face inclined to substantially the same angle as the groove side wall nearest said open end of said piston, and having the other of said side faces inclined to substantially the same angle as the other groove side wall for a relatively narrow portion of its width near its inner periphery, the remaining portion of said last mentioned side face being substantially perpendicular to the axis thereof, said ring being positioned within said groove with substantial axial and radial clearances for movement into contact at times with one or the other of said groove side walls.

2. A piston assembly comprising a piston having a peripheral groove adjacent the closed end thereof, said groove having side walls inclined from their marginal outer edges toward the open end of said piston, and an expansible ring having one side face inclined to substantially the same angle as one of said groove side walls and the other side face inclined to substantially the same angle as the other of said groove side walls, said ring being positioned within said groove with substantial axial and radial clearances for movement into contact at times with one or the other of said groove side walls, the area of contact between the ring and the groove side wall remote from said open end being materially less than the area of contact between the ring and the other of said groove side walls.

3. The combination with an engine cylinder, of a piston and ring assembly comprising a piston having a peripheral groove adjacent the closed end thereof, said groove having side walls inclined from their marginal outer edges toward the open end of said piston, and a piston ring mounted in said groove with substantial radial and axial clearances and arranged to maintain an adequate seal with said cylinder with a minimum of friction and with the fluid pressures acting in either direction, said ring being movable in the groove and engageable at times with one or the other of said groove side walls and having a materially greater area of contact with the groove side wall remote from said closed end than with the side wall nearest said closed end.

4. The combination with an engine cylinder, of a piston and ring assembly in which the pressure of the ring against the wall of said cylinder is increased or decreased in accordance with an increase or decrease in the pressure of the fluid acting within said cylinder, said assembly comprising a piston having a continuous peripheral groove adjacent its closed end, the side walls of said groove being inclined toward the open end of said piston, and a piston ring having side faces shaped to substantially correspond to the groove side walls and arranged to have a circumferential bearing engagement with one or the other of said groove side walls, the width of contact between the groove side wall nearest said closed end and the cooperating side face of said ring being less than the width of contact between the other groove side wall and its cooperating ring side face, said ring being positioned in said groove with substantial axial and radial clearances whereby the fluid within said cylinder may exert axial and radial pressures against said ring.

5. In combination with the cylinder of an engine operated by fluid under pressure, a piston having an annular groove therearound, said groove having two substantially parallel faces inclined to the axis of the piston, and a split piston ring having a beveled surface parallel to and cooperating substantially throughout its width with one of said inclined faces, and an opposite face having its inner edge chamfered, said chamfered edge being slightly spaced from the other of said inclined faces when the pressure of the fluid in said cylinder is relatively high to permit said fluid to exert pressure on the inner periphery of said ring.

6. A piston assembly for fluid engines comprising a piston having a continuous peripheral groove adjacent the closed end thereof and a ring mounted within said groove with substantial axial and radial clearances, the side wall of said groove and side face of said ring nearest the open end of said piston being correspondingly inclined substantially from their outer marginal edges toward the open end of said piston to provide intermittently cooperable circumferential bearing surfaces, and the other side wall of said groove and side face of said ring also being inclined substantially from their outer marginal edges toward the open end of said piston to provide intermittently cooperable circumferential bearing surfaces, said last mentioned bearing surfaces being of lesser width than said first mentioned bearing faces.

7. A piston assembly for fluid engines comprising a piston having a continuous peripheral groove adjacent the closed end thereof and a ring mounted within said groove with substantial axial and radial clearances, the side wall of said groove and side face of said ring nearest the open end of said piston being substantially correspondingly inclined substantially from their outer marginal edges toward the open end of said piston to provide intermittently cooperable circumferential bearing surfaces, and the other side wall of said groove and side face of said ring also being inclined substantially from their outer marginal edges toward the open end of said piston to provide intermittently cooperable circumferential bearing surfaces, said last mentioned bearing surfaces being of lesser area than said first mentioned bearing faces, the bearing surface on the side face of said ring nearest said closed end being positioned adjacent the inner periphery of said ring.

8. The combination with an engine cylinder, of a piston and ring assembly in which the pressure between the ring and the wall of said cylinder is increased or decreased in accordance with an increase or decrease in the pressure of the fluid acting within said cylinder, said assembly comprising a piston having a continuous peripheral groove adjacent its closed end, the side walls of said groove being inclined toward the open end of said piston, and a split piston ring having side faces, each of which has portions inclined to substantially the same angle as a groove side wall, said ring being positioned in said groove with a substantial axial clearance to provide intermittent circumferential contact of said ring with said groove side walls and to permit axial action of the fluid on the ring side face nearest said closed end, and with a substantial radial clearance to permit radial action of fluid on the inner periphery of said ring, the inclinations of the groove side walls and ring side faces being sufficient to maintain together with the action of the fluid pressures an adequate seal between the ring and cylinder wall under high or low fluid pressures, the axial clearance between one of the side faces of said ring and the corresponding wall of said grooves and at the radially outward portion of said groove being greater than at the radially inward portion of said groove.

9. The combination with an engine cylinder, of a piston and ring assembly in which the pressure between the ring and wall of the cylinder is increased or decreased in accordance with an increase or decrease in the pressure of the fluid acting within said cylinder, said assembly comprising a piston having a continuous peripheral groove adjacent its closed end, the side walls of said groove being inclined toward the open end of said piston, and a piston ring having side faces mounted within said groove with substantial axial and radial clearances to permit axial and radial action of the fluid within said cylinder against said ring, said ring side faces being intermittently engageable with the respective adjacent groove side walls substantially throughout their circumferential extent, at least one of said ring side faces having a relatively narrow groove wall engaging portion, the angle of inclination of said groove side walls being sufficient to maintain together with the axial and radial action of the fluid against said ring an adequate seal between said ring and cylinder wall and between said ring and piston under high or low fluid pressures.

10. The combination with an engine cylinder, of a piston and ring assembly in which the pressure between the ring and wall of the cylinder is increased or decreased in accordance with an increase or decrease in the pressure of the fluid acting within said cylinder, said assembly comprising a piston having a continuous peripheral groove adjacent its closed end, the side walls of said groove being inclined toward the open end of said piston, and a piston ring having side faces mounted within said groove with substantial axial and radial clearances to permit axial and radial action of the fluid within said cylinder against said ring, said ring side faces being intermittently engageable with the respective adjacent groove side walls substantially throughout their circumferential extent, at least one of said ring side faces having a relatively narrow groove wall engaging portion, the angle of inclination of said groove side walls being sufficient to maintain together with the axial and radial action of the fluid against said ring an adequate seal between said ring and cylinder wall and between said ring and piston under high or low fluid pressures, the radially outer portion of the clearance between said ring and the groove side wall nearest said closed end being relatively large to provide a fluid receiving pocket.

11. A packing ring having inner and outer axial faces and side faces, one of said side faces being inclined substantially throughout its width and the other side face being inclined adjacent said inner axial face for a narrow portion of its width, the remaining portion of said last mentioned side face being substantially radial, said inner axial face being greater in axial width than said outer axial face.

12. A piston and ring assembly comprising a piston having a circumferential ring groove, having side walls inclined from their marginal outer edges toward the axis of the piston and in the direction of the force of the fluid pressure against the adjacent end of the piston body, and an expansible split ring having one side face inclined to substantially the same angle as one of said groove side walls and a portion of the other side face inclined to substantially the same angle as the other of said groove side walls, said ring being positioned within said groove with substantial axial and radial clearances for movement into contact at times with one or the other of said groove side walls, the area of contact between the ring and the groove side wall nearest said adjacent end of the piston body being materially less than the area of contact between the ring and the other of said groove side walls.

13. A piston and ring assembly comprising a piston having a peripheral groove having side walls inclined from their marginal outer edges toward the axis of the piston and in the direction of the force of the fluid pressure against the adjacent end of the piston body, and an expansible split ring having side faces each of which has portions inclined to substantially the same angle as the adjacent groove side wall, said ring being mounted in said groove with a substantial axial clearance to provide intermittent circumferential contact of said ring with said groove side walls and with a substantial radial clearance to permit radial action of fluid on the inner periphery of said ring, said axial clearance between one of the side faces of said ring and the corresponding wall of said groove and at the radially outward portion of said groove being greater than at the radially inward portion of said groove.

In testimony whereof I affix my signature.
GEORGE H. ROBERTS.